United States Patent
Yadav et al.

(10) Patent No.: US 11,010,195 B2
(45) Date of Patent: May 18, 2021

(54) K-TIER ARCHITECTURE SCHEDULING

(71) Applicant: International Business Machines Corporation, Armonk, NY (US)

(72) Inventors: Vikram Yadav, Bangkok (TH); Rajesh Kumar Saxena, Maharashtra (IN); Gopal Bhageria, Kolkata (IN); Harish Bharti, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/516,513

(22) Filed: Jul. 19, 2019

(65) Prior Publication Data
US 2021/0019179 A1   Jan. 21, 2021

(51) Int. Cl.
*G06F 9/48*   (2006.01)
*G06F 9/455*   (2018.01)
*G06F 9/50*   (2006.01)

(52) U.S. Cl.
CPC ........ *G06F 9/4881* (2013.01); *G06F 9/45558* (2013.01); *G06F 9/5038* (2013.01); *G06F 2009/4557* (2013.01)

(58) Field of Classification Search
CPC .................................................. G06F 9/4881
See application file for complete search history.

(56) References Cited

U.S. PATENT DOCUMENTS

| 5,142,682 A * | 8/1992 | Lemay ............... G06F 13/14 710/243 |
| 9,396,039 B1 * | 7/2016 | Arguelles ........... G06F 11/3688 |
| 2009/0193429 A1 * | 7/2009 | Clark ............... G06F 11/079 719/313 |

(Continued)

FOREIGN PATENT DOCUMENTS

CN   102662636 A   9/2012

OTHER PUBLICATIONS

P. Mell, et al. "The NIST Definition of Cloud Computing", NIST Special Publication 800-145, Sep. 2011, Gaithersburg, MD.

(Continued)

*Primary Examiner* — Michael J Metzger
(74) *Attorney, Agent, or Firm* — Brian Restauro; George S. Blasiak; Heslin Rothenberg Farley & Mesiti PC

(57) ABSTRACT

Methods, computer program products, and systems are presented. The method computer program products, and systems can include, for instance: assigning resources of a K-tier resource pool to a certain job residing in a job queue, wherein the certain job residing in the job queue features job coupling characterized by an independent job and a dependent job which for completion depends on an output of the independent job, wherein the K-tier resource pool includes at least one foreground virtual machine (VM) having a first central processing unit (CPU) priority and at least one background virtual machine (VM) having a second CPU priority, wherein the first CPU priority is higher than the second CPU priority, wherein the assigning resources of the (Continued)

K-tier resource pool to the certain job includes assigning one or more foreground VM to the independent job and assigning one or more background VM to the dependent job.

20 Claims, 12 Drawing Sheets

(56) References Cited

U.S. PATENT DOCUMENTS

| | | | |
|---|---|---|---|
| 2011/0258320 A1* | 10/2011 | Jackson | H04L 67/1008 |
| | | | 709/226 |
| 2015/0220367 A1 | 8/2015 | Hotra et al. | |
| 2016/0085572 A1 | 3/2016 | Hotra | |
| 2016/0085587 A1* | 3/2016 | Dube | G06F 9/5005 |
| | | | 718/104 |
| 2016/0380979 A1* | 12/2016 | Dow | H04L 9/008 |
| | | | 713/168 |
| 2018/0293701 A1* | 10/2018 | Appu | G06F 9/5038 |
| 2019/0050245 A1* | 2/2019 | Bhageria | G06F 9/45504 |

OTHER PUBLICATIONS

Komarasamy, et al. "*A Novel Approach for Dynamic Load Balancing with Effective Bin Packing and VM Reconfiguration in Cloud.*" Indian Journal of Science and Technology, vol. 9(11), Mar. 2016.

\* cited by examiner

|  | JOBS | VMs | TIME SLICES | WAIT | END |
|---|---|---|---|---|---|
|  | J1 | 1 | 20 | 0 | 9 |
|  | J2 | 2 | 5 | 0 | 4 |
|  | J3 | 3 | 10 | 0 | 8 |
|  | J4 | 6 | 5 | 10 | 13 |
|  | J5 | 3 | 15 | 0 | 11 |
|  | J6 | 1 | 10 | 0 | 7 |
| Average |  |  |  | 1.6667 | 8.6667 |

FIG. 4

| TIME | N1 | N2 | N3 | N4 | N5 | N6 |
|---|---|---|---|---|---|---|
| 0 | J1 | J2 | J2 | | | |
| 1 | J1 | J2 | J2 | | | |
| 2 | J1 | J2 | J2 | | | |
| 3 | J1 | J2 | J2 | | | |
| 4 | J1 | J2 | J2 | | | |
| 5 | J1 | | | | | |
| 6 | J1 | | | | | |
| 7 | J1 | | | | | |
| 8 | J1 | | | | | |
| 9 | J1 | | | | | |
| 10 | J1 | | | | | |
| 11 | J1 | | | | | |
| 12 | J1 | | | | | |
| 13 | J1 | | | | | |
| 14 | J1 | | | | | |
| 15 | J1 | | | | | |
| 16 | J1 | | | | | |
| 17 | J1 | | | | | |
| 18 | J1 | | | | | |
| 19 | J1 | | | | | |
| 20 | J3 | J3 | J3 | | | |
| 21 | J3 | J3 | J3 | | | |
| 22 | J3 | J3 | J3 | | | |
| 23 | J3 | J3 | J3 | | | |
| 24 | J3 | J3 | J3 | | | |
| 25 | J3 | J3 | J3 | | | |
| 26 | J3 | J3 | J3 | | | |
| 27 | J3 | J3 | J3 | | | |
| 28 | J3 | J3 | J3 | | | |
| 29 | J3 | J3 | J3 | | | |
| 30 | J4 | J4 | J4 | J4 | J4 | J4 |
| 31 | J4 | J4 | J4 | J4 | J4 | J4 |
| 32 | J4 | J4 | J4 | J4 | J4 | J4 |
| 33 | J4 | J4 | J4 | J4 | J4 | J4 |
| 34 | J4 | J4 | J4 | J4 | J4 | J4 |
| 35 | J5 | J5 | J5 | J6 | | |
| 36 | J5 | J5 | J5 | J6 | | |
| 37 | J5 | J5 | J5 | J6 | | |
| 38 | J5 | J5 | J5 | J6 | | |
| 39 | J5 | J5 | J5 | J6 | | |
| 40 | J5 | J5 | J5 | J6 | | |
| 41 | J5 | J5 | J5 | J6 | | |
| 42 | J5 | J5 | J5 | J6 | | |
| 43 | J5 | J5 | J5 | J6 | | |
| 44 | J5 | J5 | J5 | J6 | | |
| 45 | J5 | J5 | J5 | | | |
| 46 | J5 | J5 | J5 | | | |
| 47 | J5 | J5 | J5 | | | |
| 48 | J5 | J5 | J5 | | | |
| 49 | J5 | J5 | J5 | | | |

FIG. 6

| TIME | N1-FG | N2-FG | N3-FG | N4-FG | N5-FG | N6-FG | N1-BG | N2-BG | N3-BG | N4-BG | N5-BG | N6-BG |
|---|---|---|---|---|---|---|---|---|---|---|---|---|
| 1 | J1 | J1 | J2 | J2 | J5 | J5 | J3 | J3 | J3 | J3 | J5 | J6 |
| 2 | J1 | J1 | J2 | J2 | J5 | J5 | J3 | J3 | J3 | J3 | J5 | J6 |
| 3 | J1 | J1 | J2 | J2 | J5 | J5 | J3 | J3 | J3 | J3 | J5 | J6 |
| 4 | J1 | J1 | J2 | J2 | J5 | J5 | J3 | J3 | J3 | J3 | J5 | J6 |
| 5 | J1 | J1 | J2 | J2 | J5 | J5 | J3 | J3 | J3 | J3 | J5 | J6 |
| 6 | J1 | J1 | J1 | J1 | J5 | J5 | J3 | J3 | J3 | J3 | J5 | J6 |
| 7 | J1 | J1 | J1 | J1 | J5 | J5 | J3 | J3 | J3 | J3 | J5 | J6 |
| 8 | J1 | J1 | J3 | J3 | J5 | J5 | J3 | J3 | J3 | J3 | J5 | J6 |
| 9 | J3 | J3 | J3 | J3 | J5 | J5 | J3 | J3 | J5 | J5 | J5 | J6 |
| 10 | J5 | J5 | J5 | J5 | J5 | J5 | J5 | J5 | J5 | J5 | J5 | J6 |
| 11 | J5 | J5 | J5 | J5 | J5 |  | J4 | J4 | J4 | J4 | J4 | J4 |
| 12 | J4 | J4 | J4 | J4 | J4 | J4 | J4 | J4 | J4 | J4 | J4 | J4 |
| 13 | J4 | J4 | J4 | J4 | J4 | J4 | J4 | J4 | J4 | J4 | J4 | J4 |
|  | 100% | 100% | 100% | 100% | 100% | 92% | 100% | 100% | 100% | 100% | 100% | 100% |

FIG. 9

K-TIER ARCHITECTURE SCHEDULING

BACKGROUND

In a computing environment scheduling is the process by which jobs are provided access to resources such as virtual machines running on computing nodes providing by physical computing nodes. Scheduling can be performed in a manner to provide load balancing and sharing of system resources. A scheduler can allocate jobs residing in a job queue to computing environment resources. A job queue can contain jobs to be processed. Users can submit requests to the job queue for processing. A scheduler can arrange jobs into an appropriate sequence and can assign resources to a job. Schedulers can schedule jobs in dependence on a variety of parameters, e.g. resource utilization, response time, waiting time, throughput, turnaround time, fault tolerance, and energy consumption.

According to a first come first serve (FCFS) scheduling algorithm, jobs can be processed in an order of arrival. If there are sufficient nodes available to run a job, the nodes are assigned and the job is started. Otherwise, a next job residing in a queue waits for a currently running job to terminate. According to a backfilling scheduling scheme, small jobs can be scheduled ahead of larger jobs in a queue so that they can be run on computing nodes that would otherwise remain idle. Various additional scheduling algorithms in use can include, e.g. easy backfilling, gang scheduling, migration gang scheduling, paired gang scheduling.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: assigning resources of a K-tier resource pool to a certain job residing in a job queue, wherein the certain job residing in the job queue features job coupling characterized by an independent job and a dependent job which for completion depends on an output of the independent job, wherein the K-tier resource pool includes at least one foreground virtual machine (VM) having a first central processing unit (CPU) priority and at least one background virtual machine (VM) having a second CPU priority, wherein the first CPU priority is higher than the second CPU priority, wherein the assigning resources of the K-tier resource pool to the certain job includes assigning one or more foreground VM to the independent job and assigning one or more background VM to the dependent job; and dispatching the certain job residing in the job queue to the K-tier resource pool for processing by the one or more foreground VM, and the one or more background VM in accordance with the assigning resources of the K-tier resource pool to the certain job.

In another aspect, a computer program product can be provided. The computer program product can include a computer readable storage medium readable by one or more processing circuit and storing instructions for execution by one or more processor for performing a method. The method can include, for example: assigning resources of a K-tier resource pool to a certain job residing in a job queue, wherein the certain job residing in the job queue features job coupling characterized by an independent job and a dependent job which for completion depends on an output of the independent job, wherein the K-tier resource pool includes at least one foreground virtual machine (VM) having a first central processing unit (CPU) priority and at least one background virtual machine (VM) having a second CPU priority, wherein the first CPU priority is higher than the second CPU priority, wherein the assigning resources of the K-tier resource pool to the certain job includes assigning one or more foreground VM to the independent job and assigning one or more background VM to the dependent job; and dispatching the certain job residing in the job queue to the K tier resource pool for processing by the one or more foreground VM, and the one or more background VM in accordance with the assigning resources of the K-tier resource pool to the certain job.

In a further aspect, a system can be provided. The system can include, for example a memory. In addition, the system can include one or more processor in communication with the memory. Further, the system can include program instructions executable by the one or more processor via the memory to perform a method. The method can include, for example: assigning resources of a K-tier resource pool to a certain job residing in a job queue, wherein the certain job residing in the job queue features job coupling characterized by an independent job and a dependent job which for completion depends on an output of the independent job, wherein the K-tier resource pool includes at least one foreground virtual machine (VM) having a first central processing unit (CPU) priority and at least one background virtual machine (VM) having a second CPU priority, wherein the first CPU priority is higher than the second CPU priority, wherein the assigning resources of the K-tier resource pool to the certain job includes assigning one or more foreground VM to the independent job and assigning one or more background VM to the dependent job; and dispatching the certain job residing in the job queue to the K-tier resource pool for processing by the one or more foreground VM, and the one or more background VM in accordance with the assigning resources of the K-tier resource pool to the certain job.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4 depicts a job allocation table according to one embodiment;

FIG. 6 is a time slice performance chart according to according to one embodiment;

FIG. 9 is a time slice performance chart according to according to one embodiment;

DETAILED DESCRIPTION

Figure 1:
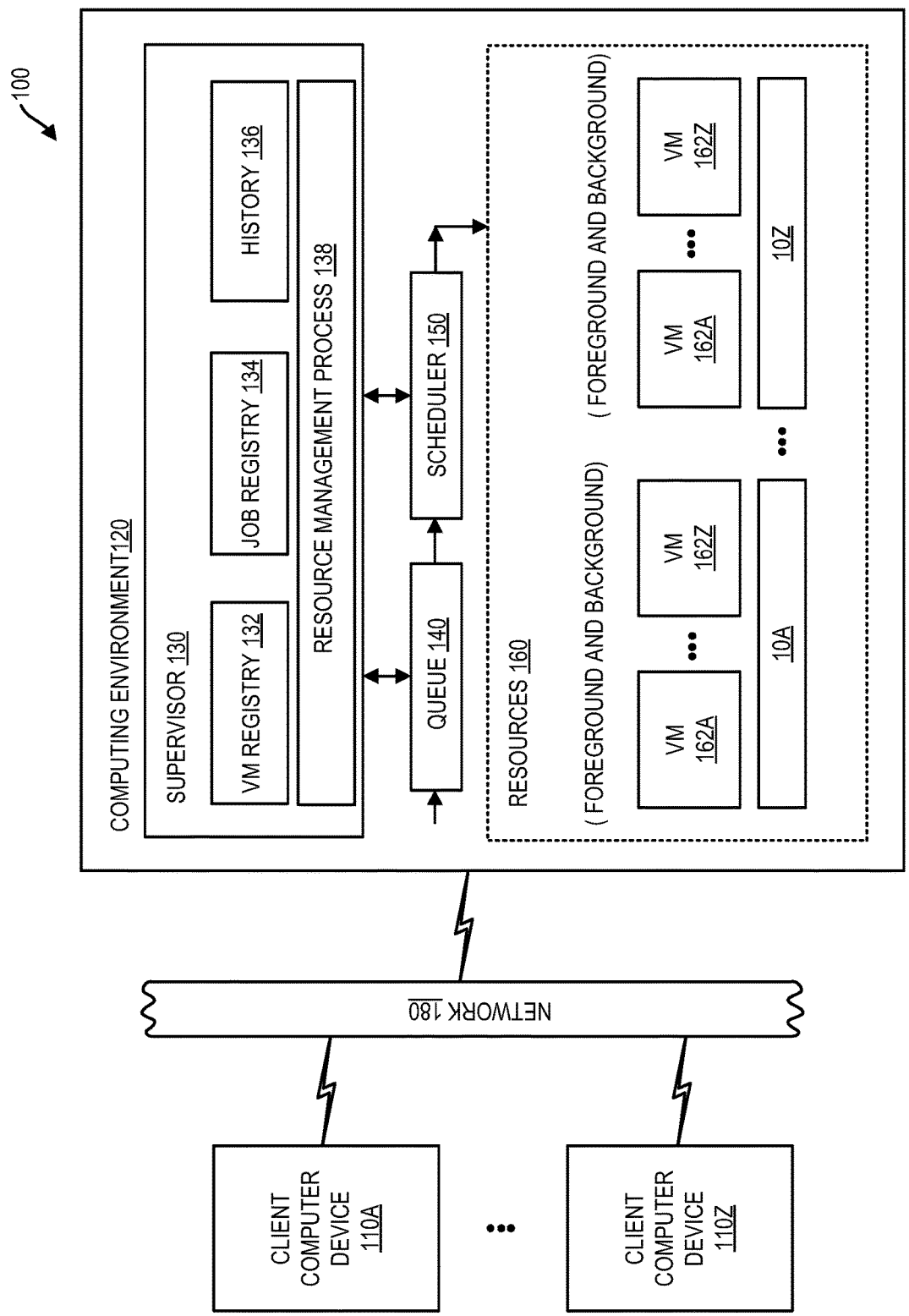
FIG. 1 depicts a system having a computing environment and a plurality of client computing devices according to one embodiment.

System 100 for computing is depicted in the schematic block diagram of FIG. 1. Computing environment 120 can receive requests from client computer devices 110A-110Z which are associated to different users. Requests can be in the form of jobs for processing by computing environment 120. Computing environment 120 can include a supervisor 130 having virtual machine (VM) registry 132, job registry 134, and history repository 136. Computing environment 120 can further include queue 140 and scheduler 150, as well as resources 160.

Supervisor 130 can run resource management process 138 for optimization of resources 160 in the processing of jobs by resources. Supervisor 130 running resource management process 138 can include supervisor 130 reducing time periods at which one or more node of resources 160 is idle. Supervisor 130 running resource management process 138 can include supervisor 130 e.g. assigning resources to jobs, dispatching jobs to resources for processing, and instantiating and deleting computing resources, such as virtual machines.

Client computer devices 110A-110Z can be in communication with computing environment 120 via network 180. Network 180 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

Resources 160 according to one embodiment can include a plurality of computing nodes 10A-10Z which can be provided by physical computing nodes Running on each computing node 10A-10Z there can be instantiated one or more virtual machine (VM). There can be instantiated VMs 162A-162Z for running on computing node 10A and there can be instantiated VMs 162A-162Z for running on computing node 10Z.

Respective computing nodes 10A-10Z can have a different set of instantiated of VMs. According to one embodiment, computing environment 120 can feature a K-tier architecture. A K-tier architecture can be characterized by having two or more different tiers of VMs. The different tiers can have assigned thereto different levels of CPU priority. According to one embodiment, VMs 162A-162Z associated with each respective computing node 10A-10Z can include one or more foreground VM and one or more background VM. The one or more foreground VM can have relatively higher CPU priority and the one or more background VM can have relatively lower VM priority. Respective computing nodes 10 A of resources 160 can run thereon at least one foreground VM and at least one background VM. The at least one foreground VM and the at least one background VM running on a common computing node 10A as depicted in FIG. 1 provided by a physical computing node can simultaneously process different jobs. In a K=2 K-tier architecture, the one more foreground VM can have a first CPU priority and the one or more background VM can have second CPU priority, the second CPU priority being lower than the first CPU priority. In a K>2 K-tier architecture, the one more foreground VM can have a first CPU priority and the one or more background VM can have at least one VM with a second CPU priority, and at least one VM with a third CPU priority, the second CPU priority being lower than the first CPU priority, and the third CPU priority being lower than the second CPU priority.

Scheduler 150 can be configured to attempt to optimize a plurality of parameters when scheduling jobs for processing by resources 160. Scheduler 150 can be configured to optimize various parameter values, e.g. resource utilization, response time, waiting time, throughput, turnaround time, fault tolerance, and/or energy consumption. Scheduling algorithms as set forth herein that can improve resource utilization of resources of computing environment 120 as well as improve response time, reduce waiting time, increasing throughput, increasing turnaround time, increasing fault tolerance, and energy consumption. Scheduler 150 running a scheduling algorithm can examine resource requirements associated to a job as may be specified in a description of a job. Jobs can be gives unique job numbers, and supervisor 130 can store data specifying statuses of all jobs stored in job registry 134. Scheduler 150 can store incoming jobs into queue 140 which can include an ordered list of jobs.

Supervisor 130 can store data specifying statuses of all jobs in job registry 134. Statuses of jobs can include PEND=waiting in queue to be scheduled and dispatched; RUN=dispatched to resources 160 and running; DONE=competed processing normally.

Resource utilization optimization herein can refer to use of a resource in a manner that can increase resource throughput. Resources, e.g. VMs, should not remain idle for long periods of time. Response time herein refers to the time period from submission of a request to the time the first response is produced. This value should be as short as possible. Waiting time herein refers to the sum of periods spent waiting in a job queue. Throughput herein refers to the total amount of work completed within a specified unit of time. Turnaround time herein refers to the total time taken between the submission of a workload comprising one or more job for execution and the return of a complete output to a user. Fault tolerance herein refers to a scheduling algorithm's ability to continue processing jobs notwithstanding failure of one or more node, e.g. VM. Energy consumption herein can refer to the amount of energy consumed in a process. Scheduling algorithms can be designed to reduce power consumption.

Performing scheduling as set forth herein, scheduler 150 can assign dependent jobs to background VMs of resources 160 and can assign independent jobs to foreground VMs of resources 160.

Dependent jobs as set forth herein can be jobs that must wait for a result produced by execution of an independent job before they can complete. Embodiments herein recognize that completion of a dependent job can be delayed no matter how scheduling of the dependent job is performed for the reason that the dependent job cannot be completed until a result from an associated independent job is available.

Embodiments herein can assign dependent jobs for execution on a background VM where they are expected to execute more slowly. Embodiments herein can assign independent jobs for execution on a foreground VM where they are expected to execute more rapidly. Embodiments herein recognize that such allocation, where a dependent job is assigned to background VM, can more efficiently utilize capacities of resources 160 than where dependent jobs are assigned to a foreground VM. Allocating a dependent job to a background VM can reduce instances of the unwanted situation where the processing time of a job is limited by the job waiting for a result of an independent job.

Embodiments herein recognize that unwanted results can be compounded when an independent job is assigned to a background VM and a dependent job is assigned to a foreground VM. The dependent job processing on the foreground VM can be slow to process because it must wait for a result to become available. The wait time can be attenuated by the slower processer time of the background VM on which the independent job is processing.

Scheduler 150 according to one embodiment can perform live migration of jobs during processing of the jobs. For example, based on scheduler 150 identifying that a foreground VM is being under-utilized, scheduler 150 can migrate dependent jobs currently running on a background VM onto a foreground VM.

Supervisor 130 can include VM registry 132 for storing data on VMs of resources 160, job registry 134 for storing data on jobs being managed by computing environment 120, and history registry 136 for storing various logging data such as job logging data. Supervisor 130 can run various processes such as resource instantiate and delete process 138.

VM registry 132 can store data on the current configuration of resources 160 as well as historical configurations of resources 160, e.g. can include such data as data specifying a total number of VMs that have been instantiated, the details of the instantiations, e.g. sizes, computing nodes, allocated resources. VM registry 132 can store data on VMs that are currently instantiated and miming as part of resources 160, as well as such data as instantiation times, scheduled deletion times. VM registry 132 can store data on classifications of instantiated VMs, e.g. as a foreground VM or as a background VM, and resource allocations (e.g. CPU, memory and storage) to instantiated VMs.

Job registry 134 can include parameter values of jobs in queue 140 being processed by resources 160, departed (completed) jobs or other jobs managed by computing environment 120 such as requested jobs to be placed on queue 140. Data of job registry 134 can include for each job a job ID and job description data which can include such data as label data as job type data and constraint data, e.g. customer requirements including in relation to such parameters as response time and turnaround time and other parameters for a given job.

History repository 136 can include historical data provided e.g. by logging data parameters associated with historical jobs that have been processed by resources 160. History repository 136 can store such data as parameters associated with the processing of past jobs, e.g. in relation to resource utilization, processing times, response time, waiting time, throughput, turnaround time, fault tolerance, program messages, and energy consumption and can store details that specify which VMs of resources 160 were responsible for processing of the past jobs.

Scheduler 150 during processing of jobs by resources 160 can be examining logging data of departed and completed jobs to determine that a departed and completed job was a job featuring job coupling defined by at least one independent job and at least one dependent job dependent on the at least one independent job. In accordance with the examining can update label data of a certain job having type in common with the examined completed job to be subsequently dispatched to that the certain job to be subsequently dispatched includes label data indicating that the certain job is a job featuring job coupling that includes at least one independent job and at least one dependent job dependent on the at least one independent job. Based on examination of job logging data performed by scheduler 150 during processing of jobs by resources 160, supervisor 130 can label common type jobs to be subsequently dispatched by scheduler 150 with label data specifying the jobs to be subsequently dispatched by scheduler 150 feature job coupling and include at least one independent job and at least one dependent job dependent on the at least one independent job.

Other schemes for labeling jobs can be utilized. For example, supervisor 130 on receipt of code defining jobs in queue 140 and based on indicators present in command data defining the code can label the code as being indicative of an independent job or alternatively, as being indicative of a dependent job. According to another scheme for labeling jobs, a user making a job request can be presented with an interface prompting the user to enter, e.g. with a client computer device of client computer devices 110A-110Z various label data associated with jobs indicating the jobs as featuring job coupling and having at least one independent job and at least one dependent job dependent on the at least one independent job.

Figure 2:
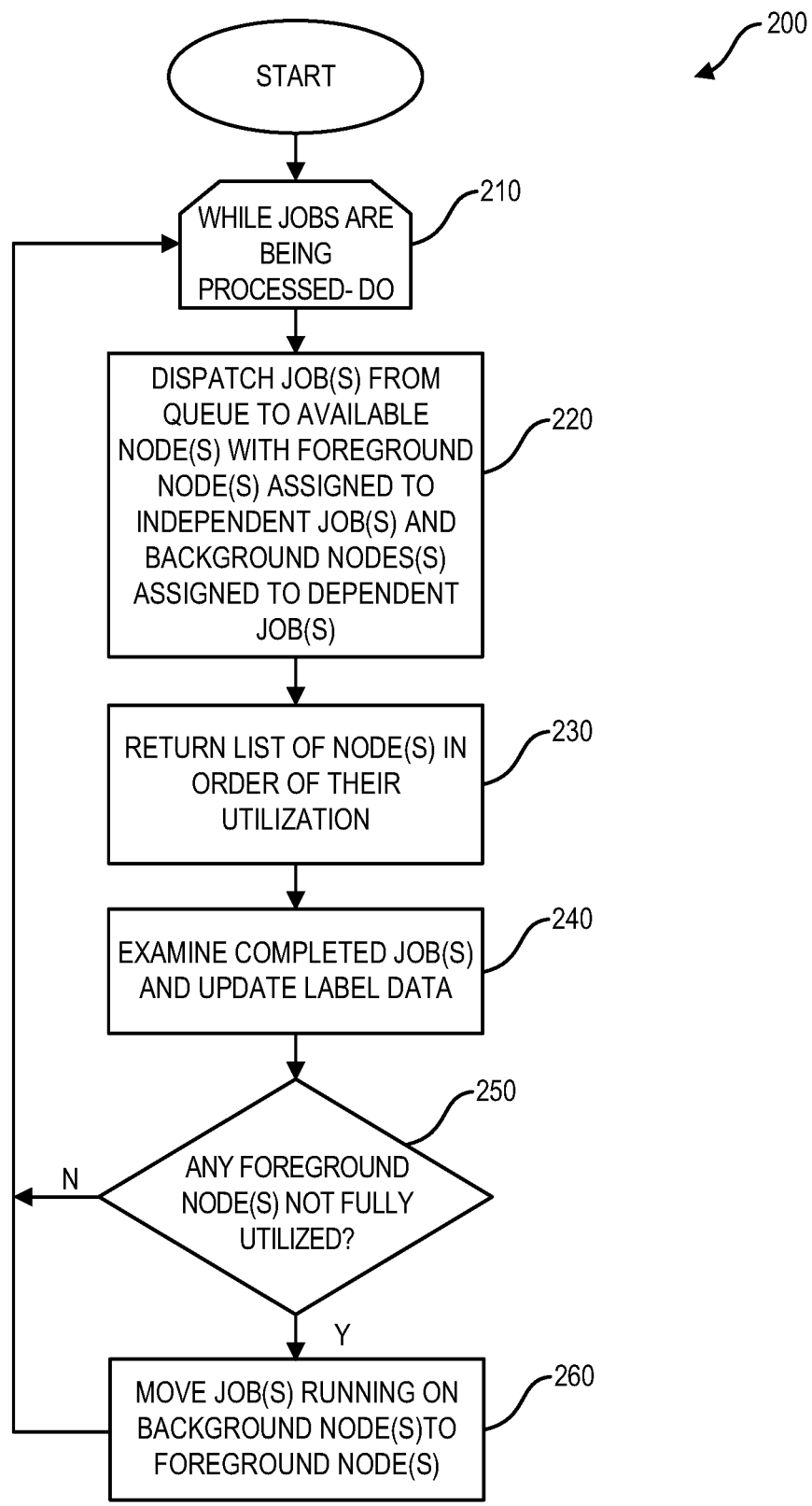
FIG. 2 is a flowchart depicting a scheduling algorithm according to one embodiment.

FIG. 2 is a flowchart illustrating functions of a scheduling algorithm 200 for performance by scheduler 150 for assigning resources of resources 160 for processing jobs residing in queue 140. While jobs are being processed (block 210) scheduler 150 can perform various functions. At block 220, scheduler 150 can dispatch job(s) from queue 140 to available node(s) with independent jobs dispatched to foreground node(s) and dependent job(s) to background node(s). The foreground and background node(s) can be provided by foreground and background VMs 162A-162Z as set forth in FIG. 1.

At block 230, scheduler 150 can return a list of node(s) in an order of their utilization. The node list returned at block 230 can be presented in an ascending order with idle nodes exhibiting lowest utilization listed first. Scheduler 150 at block 230 can cross-reference the list of nodes in order of utilization, state information specifying the most previous allocation of jobs to nodes to determine (based on 0 utilization of a node) that certain one or more nodes have departed, i.e. have fully processed a job and have been returned to idle state.

At block 240, scheduler 150 can examine logging data associated with departed and completed jobs as set forth herein to determine whether a departed and completed job was a job featuring job coupling having one or more independent job and one or more dependent job dependent on the one or more independent job. Scheduler 150 based on the examination of logging data at block 240 can update job label data so that certain jobs of a common job type of the examined job examined at block 240 are updated to specify that the certain jobs have label data specifying that the certain jobs feature job coupling and have at least one independent job and at least one dependent job dependent on the independent job (e.g. must wait for an output from an independent job for completion).

At block 250, scheduler 150 can determine whether any foreground nodes, e.g. foreground VMs of VMs 162A-162Z are not fully utilized, e.g. which are idle. On the determination at block 250 that there are no foreground nodes that are not fully utilized, scheduler 150 can return to block 210 to perform a next iteration of blocks 210 to blocks 260. On the determination at block 250 that there is one or more foreground node that is not fully utilized, scheduler 150 can proceed to block 260.

At block 260 according to one embodiment, scheduler 150 can move job(s) running on background node(s) to foreground node(s) on the determination that the foreground node(s) are not fully utilized. At block 260 according to one embodiment, scheduler 150 can migrate (move) job(s) running on background VMs of resources 160 to one or more foreground VM of resources 160 on the determination that one or more foreground VM is not fully utilized. At block 260 according to one embodiment, scheduler 150 can migrate (move) job(s) running on background VMs of resources 160 to one or more foreground VM of resources 160 on the determination that one or more foreground VM is idle and available for processing a job. On completion of block 260, scheduler 150 can return to block 210 to perform a next iteration of blocks 210-260.

Figure 3:
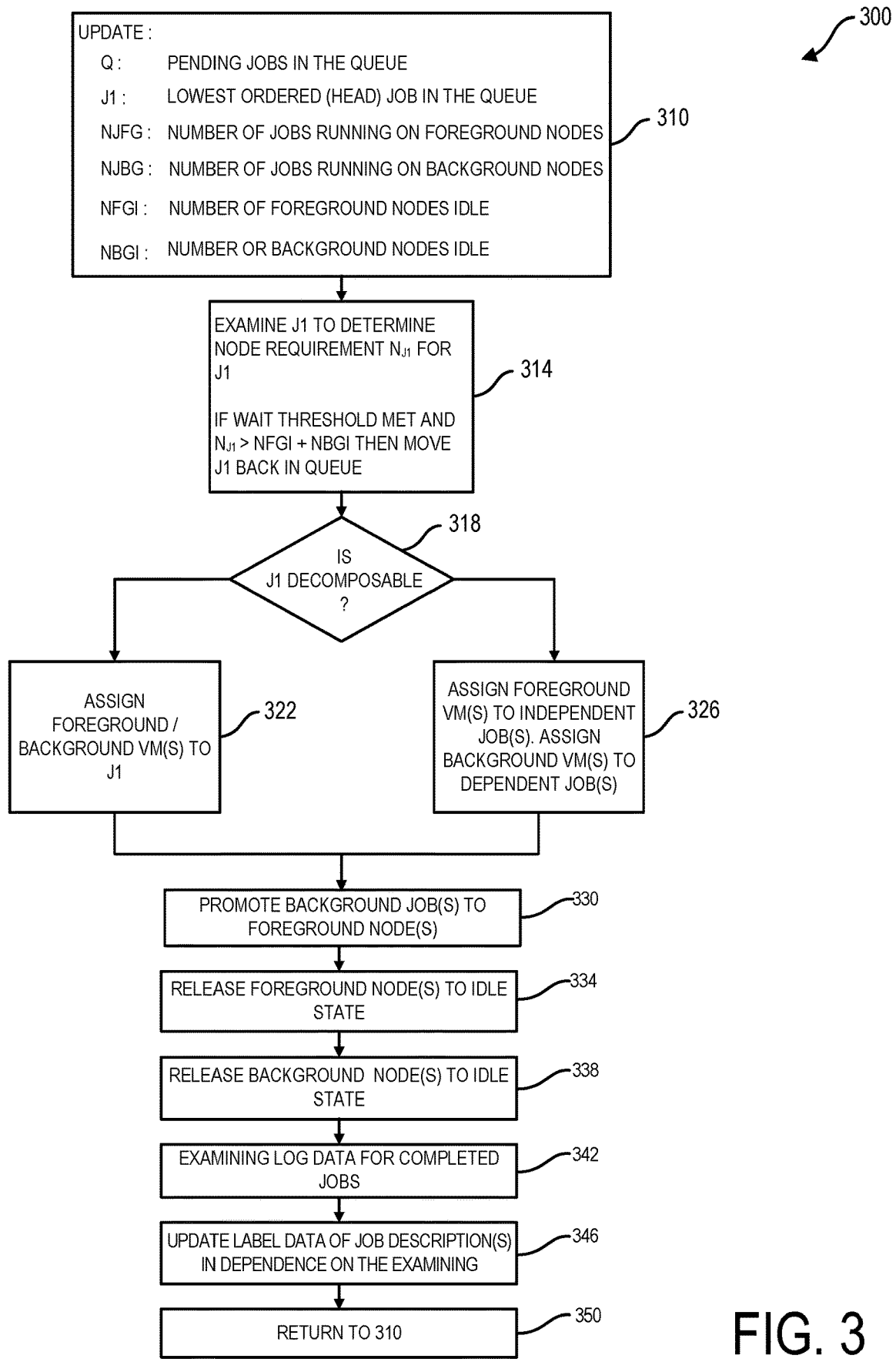
FIG. 3 is a flowchart depicting a scheduling algorithm according to one embodiment.

According to one embodiment, scheduler 150 can perform method 300 as set forth in the flowchart of FIG. 3. At block scheduler can update various parameter values. Scheduler 150 at block 310 can update such parameter values as: (a) Q, a list of pending jobs within queue 140; (b) J1, the current lowest ordered number job in queue 140, the current job at the head of queue 140; (c) NJFG, the number of jobs currently running on foreground nodes (e.g. foreground VMs) of resources 160; (d) NJBG, the number of jobs currently running on background nodes (e.g. background VMs) of resources 160; (e) NFGI, the number of foreground nodes (e.g. foreground VMs) currently idle; (f) NFBI, the number of background nodes (e.g. background VMs) currently idle.

Scheduler 150 at block 314 can determine whether there are sufficient resources within resources 160 currently available to process job J. For performance of block 310 scheduler 150 can examine label data associated to job J1. According to one embodiment, jobs processed by computing environment 120 can have unique job IDs as well as job descriptions defined by job label data. Computing environment 120 can be configured so that job label data for inclusion into a job description can be defined and/or updated by a system administrator user, supervisor 130, and/or scheduler 150. Job label data can include data specifying e.g. job type, job requirements, and other job attributes such as attributes specifying whether the job defines first and second jobs featuring job coupling, wherein the first job is an independent job and the second job is a dependent job.

For performance of block 310 scheduler 150 can examine label data associated to job J1 that specifies characteristics of resources required for processing of job J1. The label data can specify various requirements e.g. number of nodes, processing time, and the like. At block 310 scheduler 150 according to one embodiment can determine whether NJ1>NFGI+NBGI, where NJ1 is the number of nodes required for processing of job J1. Where scheduler 150 at block 310 determines that job J1 requires more nodes than are currently idle in resources 160, scheduler 150 at block 310 can push job J1 back in queue 140 so that during a next iteration of block 314 the parameter value J1 is updated to be assigned to a next job within queue 140.

Scheduler 150 on determining at block that there are currently sufficient resources within resources 160 to process job J1 can proceed to block 318. At block 318 scheduler 150 can determine whether job J1 is decomposable. For performance of block 318 according to one embodiment, scheduler 150 can examine label data of one or more job specified within job registry 134. Label data for jobs specified within job registry 134 can be updated at block 346. For performance of block 318 according to one embodiment, scheduler 150 can determine whether job J1 is decomposable into a first independent job and a second dependent job dependent on the first job completing defining jobs that feature job coupling. For performance of block 318 according to one embodiment, scheduler 150 can identify with respect to job J1 one or more instances of a first independent job and a second dependent job dependent on the first independent job. According to one embodiment, a first independent job can be defined by a first program and a second independent job dependent on the first independent job can be defined by a second program.

A second job can be a dependent job dependent on a first job herein in the case that second dependent job must wait for an output from a first job for completion. A job description associated to a job can have label data that specifies whether a job is decomposable into a first job and a second job dependent on the first job. According to one embodiment, label data specifying whether a job features job coupling and includes a first independent job and a second job dependent on the first job can be specified by an administrator user. According to one embodiment, computing environment 120 can be configured so that a computing node of computing environment 120, e.g. supervisor 130 and/or scheduler 150 automatically generates label data specifying that a job defines a first independent job and second job dependent on the first job. According to one embodiment a computing node automatically generating label data specifying that a job is a decomposable job decomposable into a first independent job and a second dependent job dependent on the first job can include the computing node examining data of history repository 136, which can store job logging data.

On the determination at block 318 that job J1 is not decomposable into a first independent job and a second dependent job dependent on the first independent job, scheduler 150 can proceed to block 322. According to one embodiment the determination that job J1 is not decomposable into a first independent job and a second dependent job can include the determination that job J1 is an uncoupled job. Accordingly, on the determination at block 318 that job J1 is an uncoupled job not coupled to another job, scheduler 150 can proceed to block 322. At block 322 scheduler 150 can assign background/foreground nodes to job J1. Scheduler 150 according to one embodiment at block 322 can assign only background node(s) to job J1. Scheduler 150 according to one embodiment at block 322 can assign only background node(s) to job J1, if there are sufficient background node(s) e.g. background VMs for processing the job. Configuring scheduler 150 so that scheduler 150 assigns only background VMs to an uncoupled job assures maximum availability of foreground VMs for processing of coupled jobs which can include one or more independent job and one or more dependent job dependent on the one or more independent job. At block 322 scheduler 150 can dispatch job J1 to the one or more background VM assigned for processing J1. On completion of block 322 scheduler 150 can proceed to block 330.

On the determination at block 322 that job J1 is decomposable into a first independent job and a second dependent job dependent on the first independent job, scheduler 150 can proceed to block 326. At block 326 scheduler 150 can assign one or more foreground VM of resources 160 for processing of the first independent job of J1 and can assign one or more background VM for processing of the second dependent job of J1. As set forth herein, scheduler 150 on determining that job J1 is decomposable can determine that there is one or more first independent job and one or more dependent job dependent one the one or more independent job. On the determination at block 322 that job J1 is decomposable into at least one first independent job and at least one second dependent job dependent on the at least one first independent job, scheduler 150 can proceed to block 326. At block 326 scheduler 150 can assign one or more foreground VM of resources 160 for processing of the at least one first independent job of J1 and can assign one or more background VM for processing of the at least one second dependent job of J1. At block 322 scheduler 150 can dispatch job J1 to the one or more foreground VM and one or more background VM assigned for processing J1. On completion of block 326 scheduler 150 can proceed to block 330.

At block 330 scheduler 150 can promote any current jobs JA-JZ running on background VMs of resources 160 to foreground VMs of resources 160. For performance block 330 scheduler 150 can examine the most recently updated parameter value, NFGI, updated during a most recent iteration of block 310 which specifies a number of foreground nodes currently idle with data specifying foreground VM assignments of block 322 or block 326 to determine whether there are available foreground VMs. For performing block 330 scheduler 150 can migrate one or more job currently processing on one or more background VM to one or more foreground VM of resources 160 determined to be available. Scheduler 150 performing block 330 assures that jobs are migrated to available idle nodes having highest CPU priority.

On completion of block 330 scheduler 150 can proceed to block 334. At block 334 scheduler 150 can release any foreground VMs of resources 160 which have completed processing to an idle state. The returned value for NFGI during a next iteration of block 310 will be updated accordingly. On completion of block 334 scheduler 150 can proceed to block 338. At block 338 scheduler 150 can release any background VMs of resources 160 which have completed processing to an idle state. The returned value for NBGI during a next iteration of block 310 will be updated accordingly. On completion of block 338 scheduler 150 can proceed to block 342.

At block 342 scheduler 150 can perform examining of job logging data. Computing environment 120 can be configured so that job logging data is reported to history repository 136. For performance of block 342 scheduler 150 can examine logging data for completed jobs completed since the time of the last iteration of block 342.

At block 346 scheduler 150 can update label data for jobs being managed by computing environment 120 including any pending jobs waiting in queue 140 to be dispatched. As set forth herein jobs can have associated job descriptions defined by various attribute data e.g. job type attribute data and attribute data specifying that the job features job coupling characterized by one or more independent job and one or more dependent job dependent on the one or more independent job. For performing block 346 scheduler 150 can update label data within a job description of jobs having specified job types in common with an examined (just completed) job examined at block 342 where examined job logging data of the examined job examined at block 342 indicates that the examined job is a job featuring job coupling having at least one first independent job and at least one dependent job dependent on the at least one independent job.

At block 346 scheduler 150 can update a process of scheduler 150 so that scheduler 150 on receipt of an incoming new request for a new job having a job type in common with a job type examined at block 342 and determined to be a job featuring job coupling having at least one independent job and at least one dependent job dependent on the at least one independent job updates label data of the new job so that label data of the incoming job indicates that the incoming job is a job featuring job coupling having at least one first independent job and at least one dependent job dependent on the at least one independent job.

For determining that an examined job, e.g. job JA examined at block 342 is a job featuring job coupling having at least one independent job and at least one dependent job, scheduler 150 can examine job logging data provided by messaging data and job logging data provided by processing time data. Scheduler 150 can determine that job JA is a job featuring job coupling having an independent job and a dependent job dependent on the second job, where, e.g., logging data for job JA indicates that a second program defining a second job (i) receives a message from a first program of JA defining a first job of JA and, (ii) completes processing in response to receipt of the message. Job logging data can include data that specifies processing initiate and complete times associated to a first command of the first program and a second command associated to the second program in the described example, wherein the commands reference parameter values passed between the first program and the second program. Accordingly, scheduler 150 determining that job JA is a job featuring job coupling having at least one independent job, and at least one dependent job dependent job dependent on the independent job, can include scheduler 150 examining logging data comprising command data of first and second programs and processing time data associated to the first and second programs.

On determination at block 342 that an examined job JA is a job featuring job coupling having at least one independent job, and at least one dependent job dependent job dependent on the independent job, scheduler 150 at block can update label data of job descriptions of all jobs managed by computing environment 120, including all jobs pending in queue 140 having a job type in common with the examined job, JA. The updated label data can specify that the managed jobs including pending job e.g. job JAA having a common job type (classification) is a job featuring job coupling having an independent job and a dependent job dependent on the independent job. Accordingly, during a subsequent iteration of block 318 where that the job JAA is assigned to the parameter value J1 as the header job of queue 140, scheduler 150 can examine the updated label data of a job description of the job JAA now assigned as J1 to determine that the job is a job featuring job coupling having at least one independent job and at least one dependent job dependent on the at least one independent job.

Scheduler 150 at block 342 according to one embodiment can examine job logging data determine a qualitative parameter value that specifies a degree of coupling of a dependent job to an independent job. Scheduler 150 can specify degree of coupling for a dependent job in dependence on a timing overlap between the dependent job and the independent job on which the dependent job depends. According to one example, scheduler 150 can assign a 15% degree of coupling for an illustrative dependent job, where 85% of a processing time for completion of the dependent job is performed prior to the dependent job receiving a parameter value from an independent job on which it depends, and where 15% of a processing time for completion of the dependent job is performed after the dependent job receives a parameter value from an independent job on which it depends. Further according to the example., scheduler 150 can assign a 100% degree of coupling for an illustrative dependent job, where 0% of a processing time for completion of the dependent job is performed prior to the dependent job receiving a parameter value from an independent job on which it depends, and where 100% of a processing time for completion of the dependent job is performed after the dependent job receives a parameter value from an independent job on which it depends (in the described scenario where scheduler 150 assigns a 100% degree of coupling to a dependent job the dependent job cannot commence processing until it receives a parameter value from the independent job). Scheduler 150, on determining a degree of coupling for a dependent job can update label data within a job description of the dependent job to specify to specify the determined degree of coupling. According to one embodiment, a dependent job having a 100% degree of coupling with respect to an independent job (100% coupled to a dependent job) can be regarded to be a tightly coupled job that is entirely coupled to the independent job.

According to one embodiment, where computing environment 120 features a K>2 K-tier architecture, scheduler 150 at block 326 can assign VMs to dependent jobs based on and in dependence on an assigned degree of coupling that scheduler 150 has assigned to the job type of the dependent job and specified within updated label data during a prior iteration of block 346. Tightly coupled jobs herein which can include jobs that are 100% (entirely coupled) to an independent job can feature degrees of coupling that are greater than that of loosely coupled jobs. Embodiments herein recognize that loosely coupled jobs, e.g. having a degree of coupling of less than or equal to 20% according to one possible designation may be more likely to benefit from placement on a VM having relatively higher CPU priority than a tightly coupled job having a degree of coupling greater than or equal to 80% according to one possible designation. Stated another way, a more tightly coupled job may have to wait to commence processing in any respect and therefore may be less likely to benefit from placement on a relatively higher priority CM. Accordingly, where computing environment 120 features a K>2 K-tier architecture having a foreground VM with a first CPU priority, a first background VM with a second CPU priority lower than the first CPU priority and a second background VM with a third CPU priority lower than the second priority and where scheduler 150 at block 326 examines dependent job descriptions to determine that a first dependent job dependent on an independent job has a 15% degree of coupling with respect to (is 15% coupled to) an independent job, and where scheduler 150 at block 326 examines dependent job descriptions to determine that a second dependent job dependent on the independent job that has a 100% degree of coupling with respect to (is 100% coupled to) an independent job, scheduler 150 at block 326 can assign the first background VM (with second CPU priority) to the first dependent job (15% coupled to the independent job) and at block 326 can assign the second background VM (with third CPU priority) to the second independent job (100% coupled to the independent job).

On completion of block 346 scheduler 150 can proceed to block 350. At block 350 scheduler 150 can return to block 310 to update the parameter values (a) Q, a list of pending jobs within queue 140; (b) J1, the current lowest ordered number job in queue 140, the current job at the head of queue 140; (c) NJFG, the number of jobs currently running on foreground nodes (e.g. foreground VMs) of resources 160; (d) NJBG, the number of jobs currently running on background nodes (e.g. background VMs) of resources 160; (e) NFGI, the number of foreground nodes (e.g. foreground VMs) currently idle; (f) NFBI, the number of background nodes (e.g. background VMs) currently idle. Scheduler 150 can iteratively perform the loop of blocks 310 through 350.

Embodiments herein can include computing environments featuring a K-tier architecture for virtual machines (VM). Jobs processed by computing environments herein can be processed using e.g. multi tasking, multi processing and/or multi threading. Embodiments herein can break and decompose job into different batches of operation. Embodiments herein can provide a scheduling framework for a K-tier architecture wherein the jobs are coupled.

For completing a task, a computing environment herein can start a process in run time environment. Embodiment herein can ascertain a degree of coupling of a job e.g. as either loosely coupled or tightly coupled. Embodiments herein recognize that the more the loose the coupling, the higher the scalability of jobs as the same job can be processed from the same heap space. Embodiments herein can provide for job division based on K-layers of VM assignment.

Types of computing models can include, e.g.: Parallel, Grid and Distributed Computing. Cloud Computing is condensed form of distributed and grid computing. A data center can provide an element of IaaS in Cloud computing. Embodiments herein can provide assignment of a complex job that need lots of time to get computed. According to one embodiment, by applying parallel processing, jobs can be assigned into K layers of VMs, e.g. foreground VMs and background VMs.

Response time can be regarded as the amount of time it takes from a request submission until the first response is produced, not output (for time-sharing environment). According to one embodiment, jobs can be run on in a scalable as well as a non scalable modes of operations. According to one embodiment a job can be decomposed and dispatched for processing into K layers of V's that include one or more foreground VM and one or more and background VM. Embodiments herein can minimize the idle time, and minimize energy consumption, etc. The cloud computing paradigm promises a cost-effective solution for running business applications through the use of virtualization technologies, highly scalable distributed computing, and data management techniques as well as a pay-as-you-go pricing model. As cloud is pay per model embodiments can utilize the computation in efficient manner. Cloud also offers high-performance computing capacity for applications to solve complex problems.

Embodiments herein recognize that improving resource utilization is essential for achieving cost effectiveness. Embodiments herein recognize that in legacy data centers, low utilization has long been an issue. Embodiments herein recognize that Servers in a legacy data center might be operated at 10 to 50 percent of their maximum utilization level. For a data center, or a subset of servers in a data center that mainly handles applications with high-performance computing needs and runs parallel jobs most of the time, the problem can be significant.

Embodiments herein recognize that for running parallel jobs in a distributed Cloud environment, a major challenge is that as in case of parallel job requirement is of certain number of nodes to run. a set of nodes is likely to be fragmented by parallel jobs with different node number requirement. If the number of available nodes cannot satisfy the requirement of an incoming job, these nodes may remain idle and utilization of the node is low.

Embodiments herein recognize that the most basic but popular batch scheduling algorithm for parallel jobs is first come first serve (FCFS). FCFS can specify the number of nodes required and the scheduler can process jobs according to the order of their arrival. When there is a sufficient number of nodes to process the job at the head of the queue, the scheduler can dispatch the job to run on these nodes; otherwise, it waits till jobs currently running finish and release enough nodes for the job.

Embodiments herein can provide K-tier division of a job featuring job coupling in which an independent job and a dependent job of the job featuring job coupling are running, respectively, in a foreground VM and background of VM. Embodiments herein can provide a scheduling framework that gives a systematic way to consolidate parallel jobs between foreground and background virtual division of virtual operation in cloud environment with least idle time. Embodiments herein can provide: (i) Reliable and fast response time system for parallel processing of jobs. (ii) An implementation reference architecture that embodies the various parts of the scheduling framework thus making it a self-coordinating system According to one embodiment, all instances can be configured to be executing foreground and background processes mutually exclusive to each other for a virtualization deployment. Jobs identified as featuring coupling can be broken down into an execution plan with clear dependencies being identified between individual execution blocks being stratified into first and second distinct tiers. The dependencies can be executed in the background tier while the primary blocks can be placed in the foreground tier. According to one embodiment, a scheduler 150 can restrict jobs from being executed in the background for an instance if the foreground is not fully (appropriately) utilized.

Features and advantages of embodiments herein are further set forth with reference to Example 1 and Example 2. Example 1 sets forth performance data which may be returned in accordance with application of a first come first serve (FCFS) scheduling algorithm by scheduler 150. Example 2 sets forth performance data which may be returned in accordance with application of a K-tier assigned scheduling algorithm by scheduler 150 as described in connection with the flowcharts of FIG. 2 and FIG. 3. According to one embodiment, computing environment 120 can be configured so that scheduler 150 performs scheduling in accordance with a selected on of an FCFC scheduling algorithm or in accordance with a K-tier assigned scheduling algorithm as described in connection with the flowchart of FIGS. 2 and 3, in response to activation of control signal activated in response to a manually input control or in response to a triggering signal of an automated process such as data monitoring process.

EXAMPLE 1

Referring to FIG. 4, job registry 134 can store in job description data associated to Jobs J1-J6 in queue 140 requirements data. Requirements data can include e.g. node instance data, e.g. the number of VMs required to process the job, and time units data, e.g. the number of time slices required for completion of a job. Referring to the table of FIG. 4, job J1 requires one VM, and 20 time slices. Job J2 requires four VMs and 5 time slices, job J3 requires three VMs and 10 time slices and so on. In the Table of FIG. 4, WAIT time refers to the time the respective job had to wait before it was picked up for processing, and END refers to the total time for job execution.

Figure 5:
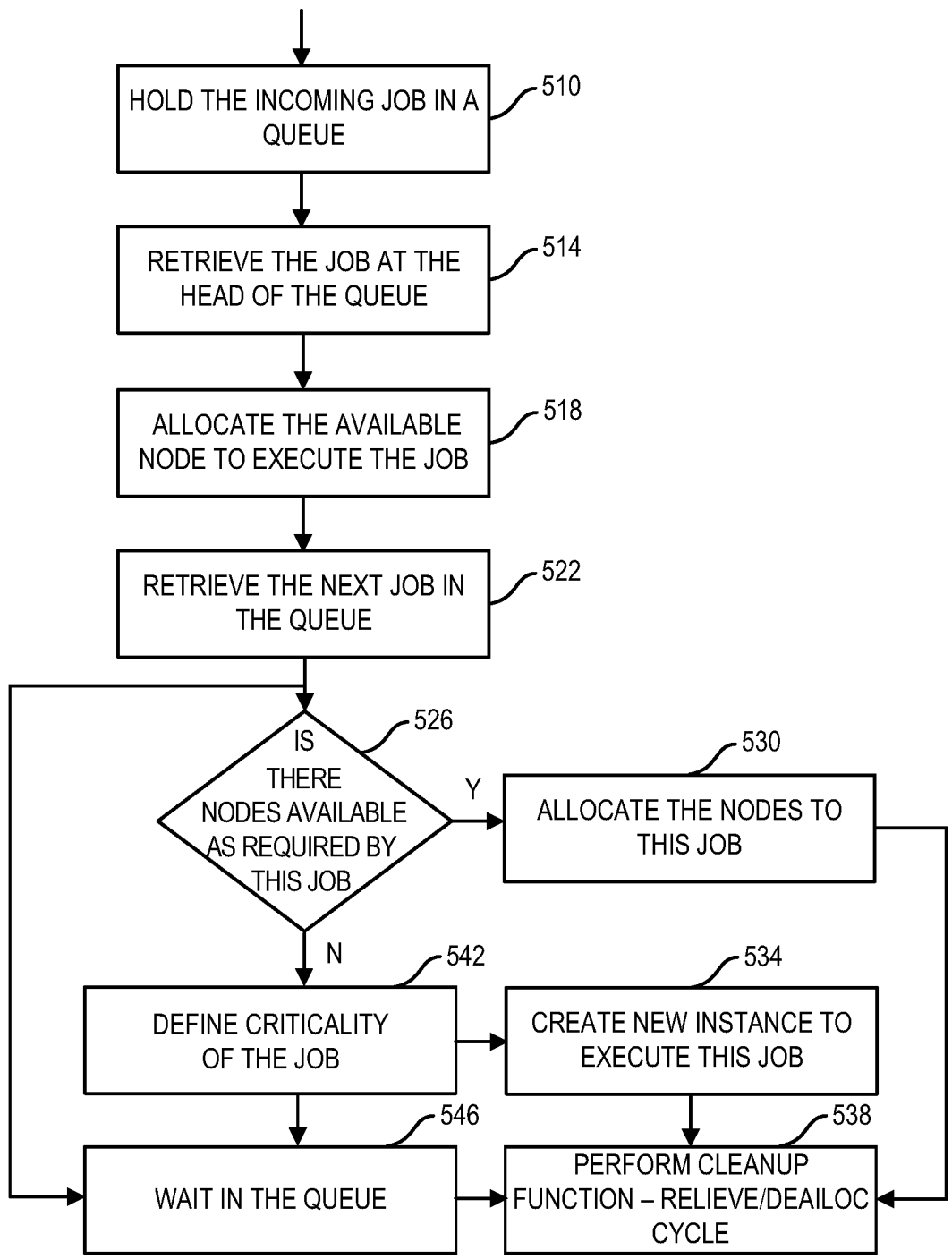
FIG. 5 is a flowchart depicting a scheduling algorithm according to one embodiment.
Figure 7:
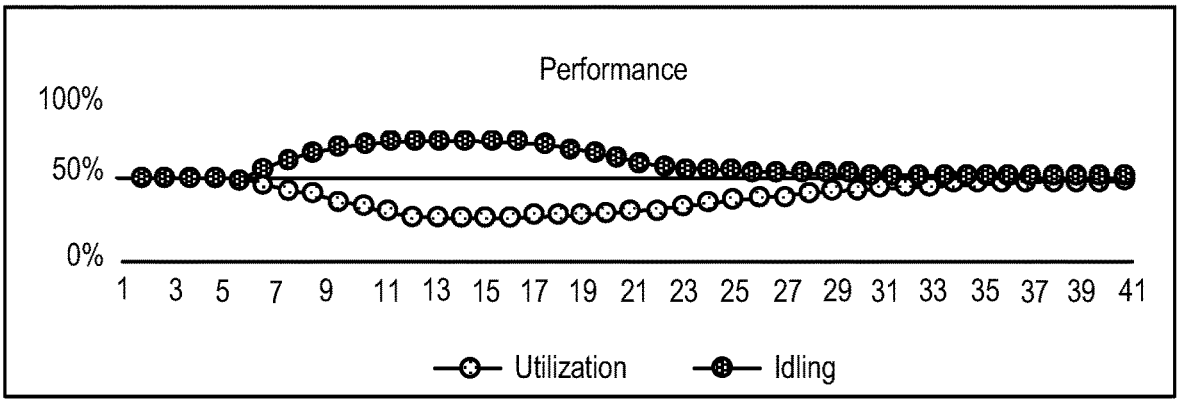
FIG. 7 is a utilization chart depicting node utilization with use of a scheduling algorithm according to one embodiment.
Figure 8:
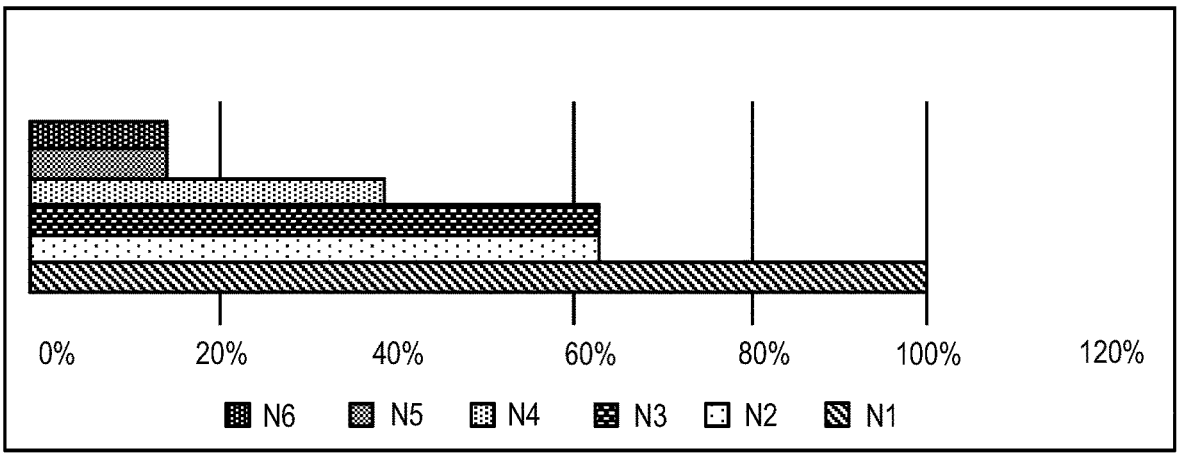
FIG. 8 is a utilization chart depicting node utilization with use of a scheduling algorithm according to one embodiment.

Blocks 510-546 of the flowchart of FIG. 5 depict functions that can be performed by scheduler 150 in accordance with an FCFS scheduling algorithm. FIGS. 6-8 illustrate performance data that can be exhibited by resources 160 when jobs are scheduled according to a FCFS algorithm. Time slice data is presented in FIG. 6 wherein N1-N6 are nodes providing by VMs running within resources 160. In the described example, it may consume 49 time slices to process jobs J1-J5. Utilization data is depicted in FIGS. 7 and 8 for Example 1. In the described example, some nodes can feature utilization as low as 15%.

END OF EXAMPLE 1

EXAMPLE 2

Figure 10:
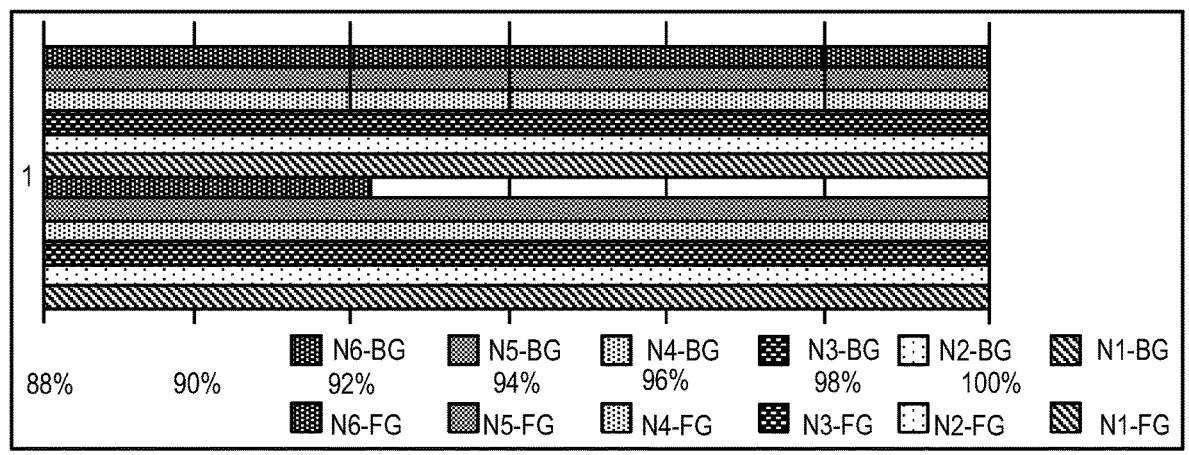
FIG. 10 is a utilization chart depicting node utilization with use of a scheduling algorithm according to one embodiment.
Figure 11:
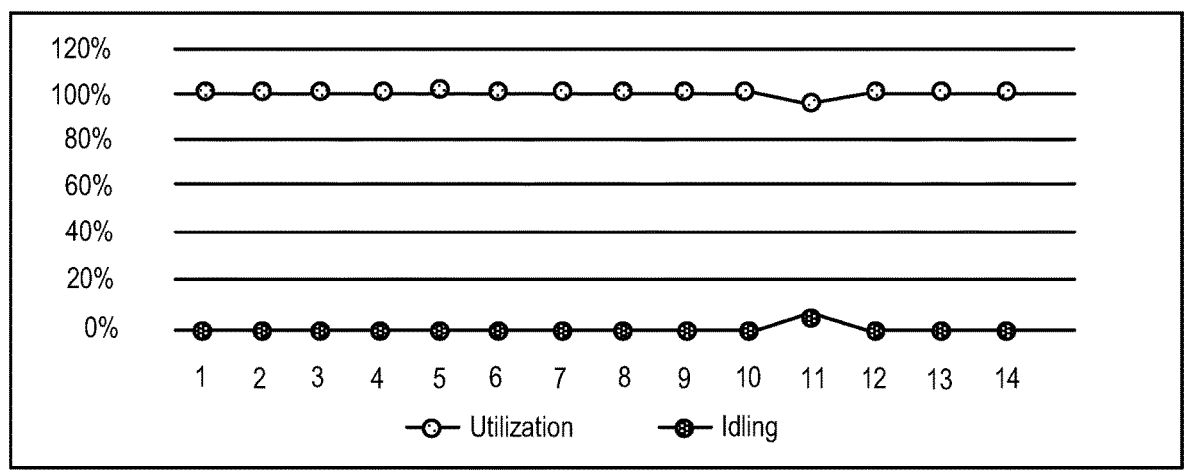
FIG. 11 is a utilization chart depicting node utilization with use of a scheduling algorithm according to one embodiment.

FIGS. 9-11 depict illustrative performance data in the case a K-tier assigned scheduling algorithm as set forth in connection with the flowchart of FIGS. 2 and 3 is active. FIG. 9 is a time slice table depicting performance of jobs through time slices in the case of scheduling in accordance with the scheduling algorithm set forth in the flowcharts of FIGS. 2 and 3 is active. Processing of jobs J1-J6 can be completed within 13 time slices according to one embodiment. All nodes N1-FG through N6-BG can have 100% utilization except for node N6-FG which can feature 92% utilization according to one embodiment. FIGS. 10 and 11 are utilization charts depicting that all nodes N1-FG through N6-BG can have 100% utilization except for node N6-FG which can feature 92% utilization according to one embodiment.

END OF EXAMPLE 2

In that a random process cannot be accurately modeled by a single exponential state, it can be useful to combine a number of exponentials leading to the more general class of phase type distributions; three special cases of phase type distributions, namely Hypo exponential.

An evaluation of the model is constructed by considering only exponentially distributed timed and immediate transitions. Embodiments herein can apply phase approximation tries to reproduce the behavior of the unknown distribution function.

Measured data from the real system with an average d and a standard deviation d. This helps in adjusting stochastic behavior through the phase approximation technique. The inverse of the variation coefficient of the measured data $$\frac{1}{CV} = \frac{\mu d}{\sigma d} \quad \text{(Eq. 1)}$$

This allows the selection of which distribution matches it best. It is noteworthy that the adopted distributions for phase approximation are capable to model Erlang, Hypo exponential and Hyper exponential distributions.

Given that the inverse of the variation coefficient can range to a whole number different from one, it would suggest trapezoidal transformation and thus the empirical data is certainly characterized by an Erlang distribution. This distribution is represented in adopted model by a sequence of exponential transitions whose length can be shown as.

$$y = \left(\frac{\mu d}{\sigma d}\right)^2 \quad \text{(Eq. 2)}$$

The firing rate of each exponential transition can then be calculated as $$\lambda = \frac{\Upsilon}{\mu d} \quad \text{(Eq. 3)}$$

Adopted model now represents the distribution composed of a sequence whose length is calculated by $$\left(\frac{\mu d}{\sigma}\right)^2 - 1 \le \Upsilon < \left(\frac{\mu d}{\sigma}\right)^2 \quad \text{(Eq. 4)}$$

The adopted model here is the hypo exponential distribution depicted graphically in FIG. 4. The hypo-exponential distribution is a generalization of the Erlang distribution (a Gamma distribution with an integer-valued shape parameter) and a special case of the phase-type distribution.

It thus allows us to bring the variation modulation in adopted model as the hypo exponential distribution is two or more exponential distribution convolved together. The firing rate of each exponential transition is given by, $$\lambda_1 = \frac{1}{\mu_1} \quad \text{(Eq. 5)}$$

$$\lambda_1 = \frac{1}{\mu_2} \quad \text{(Eq. 6)}$$

Where, the respective average delays (expected values) of times assigned to the exponential transitions are calculated by $$\mu_1 = \mu_d \mp \frac{\sqrt{\gamma(\gamma+1)\sigma^2 - \gamma\mu^2}}{\gamma+1} \quad \text{(Eq. 7)}$$

$$\mu_2 = \Upsilon\mu_d \pm \frac{\sqrt{\gamma(\gamma+1)\sigma^2 - \gamma\mu^2}}{\gamma+1} \quad \text{(Eq. 8)}$$

Alternatively, embodiment can apply the embedded Markov chain to represent the states and transitions of the queueing system with the hypo exponential service time where k denotes the number of requests in the system and n denotes the number of the stage processing some request.

The steady state probability at the state (k, n) is given by pk, n.

Then the generalization case would lead us to solve the transition states to deduce the following, The mean number of requests in the system is $$\overline{K} = \Sigma_{i=1}^{K} \Sigma_{j=1}^{N} i p_{ij} \quad \text{(Eq. 9)}$$

The mean time spent by a request in the system if it was not rejected at the entrance to the queue because of the buffer overflow is expressed as $$W = \frac{K}{r} = \frac{1}{\lambda} \cdot \frac{\sum_{i=1}^{K} \sum_{j=1}^{N} i p_{ij}}{1 - \sum_{j=1}^{N} p K_j} \quad \text{(Eq. 10)}$$

For the numerical solution of the transient behavior of the adopted model, embodiment can apply the Runge-Kutta method with adaptive stepsize control. In adaptive step-size control, the algorithm observes its progress at each step and adjusts the step-size according to the accuracy required. It increases the step-size as far as the predetermined accuracy allows and completes the integration with fewer number of steps than it would without any increase in step-size. Obviously, this adaptive step-size control feature results in faster integration for the required integration duration.

In the model, transition rates determine the transient behavior of the system. As the ratios between these rates change drastically, the transient status of the system alters faster.

Note that this activity affects the Kolmogorov-equations by decreasing the iteration interval (t+"t") or, in other words, increases the rate of change in the system. Therefore, it diminishes the potential gain in run-time through the adaptive step-size control of the method.

It can be seen that when the logarithmic proportion of transition rates exceeds a certain value, the number of steps increases drastically. Given that the number of steps is one of the main factors determining the run-time, there is evidence of a similar relationship between logarithmic proportions of transition rates and run-time.

Eqs. 1-10 herein evidence that assignment of different tiered nodes having different CPU priorities to different jobs in dependence on whether the job is dependent on another job (and in some embodiments in dependence on a degree of coupling between jobs), can improve performance of a computing environment terms of e.g. resource utilization, response time, waiting time, throughput, turnaround time, fault tolerance, and/or energy consumption.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer implemented method including: assigning resources of a K-tier resource pool to a certain job residing in a job queue, where the certain job residing in the job queue features job coupling characterized by an independent job and a dependent job which for completion depends on an output of the independent job, where the K-tier resource pool includes at least one foreground virtual machine (VM) having a first central processing unit (CPU) priority and at least one background virtual machine (VM) having a second CPU priority, where the first CPU priority is higher than the second CPU priority, where the assigning resources of the K-tier resource pool to the certain job includes assigning one or more foreground VM to the independent job and assigning one or more background VM to the dependent job; and dispatching the certain job residing in the job queue to the K-tier resource pool for processing by the one or more foreground VM, and the one or more background VM in accordance with the assigning resources of the K-tier resource pool to the certain job. Other embodiments of this aspect include corresponding computer systems, apparatus, and computer programs recorded on one or more computer storage devices, each configured to perform the actions of the methods.

Implementations may include one or more of the following features. The computer implemented method where the method includes determining that the certain job features job coupling characterized by the independent job and the dependent job which depends on the output from the independent job for completion, and where the assigning resources of the K-tier resource pool to the certain job is performed in response to the determining that the certain job features job coupling defined by the independent job and the dependent job which depends on the output from the independent job for completion. The computer implemented method where the method includes determining that the certain job features job coupling characterized by the independent job and the dependent job which depends on the output from the independent job for completion, and where the assigning resources of the K-tier resource pool to the certain job is performed in response to the determining that the certain job features job coupling defined by the independent job and the dependent job which depends on the output from the independent job for completion, where the determining includes examining label data included within a job description associated to the certain job. The computer implemented method where the method includes identifying one or more idle VMs of the at least one foreground VMs of the resource pool and migrating one or more running job being processed by a background VM of the at least one background VM to the one or more idle VM. The computer implemented method where the method includes examining job logging data of a completed job which has completed processing within the resources pool, updating label data of a subsequent job for dispatching to the resource pool subsequently to a time of the assigning resources of the K-tier resource pool to the certain job, and subsequently dispatching the subsequent job in dependence on the label data updated by the updating. The computer implemented method where the method includes examining job logging data of a completed job which has completed processing within the resources pool, updating label data of a subsequent job for dispatching to the resource pool subsequently to a time of the assigning resources of the K-tier resource pool to the certain job, and subsequently dispatching the subsequent job in dependence on the label data updated by the updating, where the label data updated by the updating specifies that the subsequent job features job coupling characterized by a first job and a second job that depends on an output of the first job. The computer implemented method where the independent job is defined by a first program and where the dependent job is defined by a second program. The computer implemented method where the method includes, subsequent to the assigning resources of the K-tier resource pool to the certain job, further assigning resources of the K-tier resources to a specified job, where the specified job is an uncoupled job that is not decomposable into an independent job and a dependent job dependent on the independent job. The computer implemented method where the method includes, subsequent to the assigning resources of the K-tier resource pool to the certain job, further assigning resources of the K-tier resources to a specified job, where the specified job is an uncoupled job that is not decomposable into an independent job and a dependent job dependent on the independent job, where the further assigning resources of the K-tier resources to the specifies job included restricting assigning of resources so that only one or more background VM of the at least one background VM, and not any foreground VM of the at least one foreground VM is assigned to the specified job. The computer implemented method where the method includes, subsequent to the assigning resources of the K-tier resource pool to the certain job, further assigning resources of the K-tier resources to a specified job, where the method includes ascertaining that the specified job is an uncoupled job that is not decomposable into an independent job and a dependent job dependent on the independent job, where the further assigning resources of the K-tier resources to the specifies job included restricting assigning of resources so that only one or more background VM of the at least one background VM, and not any foreground VM of the at least one foreground VM is assigned to the specified job, where the further assigning resources is performed in response to the ascertaining. The computer implemented method where the method includes determining that the certain job features job coupling defined by the independent job, the dependent job which depends on the output from the independent job for completion, and a second dependent job which depends on data from the independent job for completion, where the determining includes determining that the dependent job has a first lower degree of coupling to the independent job expressed by a first lower percentage value, and where the determining includes determining that the second dependent job has a second higher degree of coupling to the independent job expressed by second higher percentage value, where the K-tier resource pool includes at least one second background virtual machine (VM) having a third CPU priority, where the third CPU priority is lower than the second CPU priority, where the assigning resources of the K-tier resource pool to the certain job includes assigning one or more foreground VM to the independent job, assigning one or more background VM to the dependent job, and assigning one or more second background VM to the second dependent job. The computer implemented method where the method includes determining that the certain job features job coupling defined by the independent job, the dependent job which depends on the output from the independent job for completion, and a second dependent job which depends on data from the independent job for completion, where the determining includes determining that the dependent job is a loosely coupled job with respect to the independent job expressed by a first lower percentage value, and where the determining includes determining that the second dependent job is a tightly coupled job with respect to the independent job expressed by second higher percentage value, where the K-tier resource pool includes at least one second background virtual machine (VM) having a third CPU priority, where the third CPU priority is lower than the second CPU priority, where the assigning resources of the K-tier resource pool to the certain job includes assigning one or more foreground VM to the independent job, assigning one or more background VM to the dependent job, and assigning one or more second background VM to the second dependent job. Implementations of the described techniques may include hardware, a method or process, or computer software on a computer-accessible medium.

One general aspect includes a computer program product including: a computer readable storage medium readable by one or more processing circuit and storing instructions for execution by one or more processor for performing a method. The computer program product also includes assigning resources of a K-tier resource pool to a certain job residing in a job queue, where the certain job residing in the job queue features job coupling characterized by an independent job and a dependent job which for completion depends on an output of the independent job, where the K-tier resource pool includes at least one foreground virtual machine (VM) having a first central processing unit (CPU) priority and at least one background virtual machine (VM) having a second CPU priority, where the first CPU priority is higher than the second CPU priority, where the assigning resources of the K-tier resource pool to the certain job includes assigning one or more foreground VM to the independent job and assigning one or more background VM to the dependent job. The computer program product also includes dispatching the certain job residing in the job queue to the K-tier resource pool for processing by the one or more foreground VM, and the one or more background VM in accordance with the assigning resources of the K-tier resource pool to the certain job. Other embodiments of this aspect include corresponding computer systems, apparatus, and computer programs recorded on one or more computer storage devices, each configured to perform the actions of the methods.

Implementations may include one or more of the following features. The computer program product where the method includes determining that the certain job is a coupled job defined by the independent job and the dependent job which depends on the output from the independent job for completion, and where the assigning resources of the K-tier resource pool to the certain job is performed in response to the determining that the certain job is a coupled job defined by the independent job and the dependent job which depends on the output from the independent job for completion. The computer program product where the method includes determining that the certain job is a coupled job defined by the independent job and the dependent job which depends on the output from the independent job for completion, and where the assigning resources of the K-tier resource pool to the certain job is performed in response to the determining that the certain job is a coupled job defined by the independent job and the dependent job which depends on the output from the independent job for completion, where the determining includes examining label data included within a job description associated to the certain job. The computer program product where the method includes identifying one or more idle VMs of the at least one foreground VMs of the resource pool and migrating one or more running job being processed by a background VM of the at least one background VM to the one or more idle VM. The computer program product where the method includes examining job logging data of a completed job which has completed processing within the resources pool, updating label data of a subsequent job for dispatching to the resource pool subsequently to a time of the assigning resources of the K-tier resource pool to the certain job, and subsequently dispatching the subsequent job in dependence on the label data updated by the updating. The computer program product where the method includes examining job logging data of a completed job which has completed processing within the resources pool, updating label data of a subsequent job for dispatching to the resource pool subsequently to a time of the assigning resources of the K-tier resource pool to the certain job, and subsequently dispatching the subsequent job in dependence on the label data updated by the updating, where the label data updated by the updating specifies that the subsequent job is a coupled job characterized by a first job and a second job that depends on an output of the first job. The computer program product where the independent job is defined by a first program and where the dependent job is defined by a second program. Implementations of the described techniques may include hardware, a method or process, or computer software on a computer-accessible medium.

One general aspect includes a system including: a memory, at least one processor in communication with memory, and program instructions executable by one or more processor via the memory to perform a method. The system also includes assigning resources of a K-tier resource pool to a certain job residing in a job queue, where the certain job residing in the job queue features job coupling characterized by an independent job and a dependent job which for completion depends on an output of the independent job, where the K-tier resource pool includes at least one foreground virtual machine (VM) having a first central processing unit (CPU) priority and at least one background virtual machine (VM) having a second CPU priority, where the first CPU priority is higher than the second CPU priority, where the assigning resources of the K-tier resource pool to the certain job includes assigning one or more foreground VM to the independent job and assigning one or more background VM to the dependent job. The system also includes dispatching the certain job residing in the job queue to the K-tier resource pool for processing by the one or more foreground VM, and the one or more background VM in accordance with the assigning resources of the K-tier resource pool to the certain job. Other embodiments of this aspect include corresponding computer systems, apparatus, and computer programs recorded on one or more computer storage devices, each configured to perform the actions of the methods.

Certain embodiments herein may offer technical computing advantages including computing advantages in the realm of computer systems and computer networks. Embodiments herein can include a scheduler that dispatches jobs residing in a queue to various computing resources for processing. The resources for processing can include, according to one embodiment, virtual machines (VMs) running on one or more computing node provided by a physical computing node. A computing environment scheduler as set forth herein can improve the functioning of a computer system in various ways. According to one embodiment, a scheduler as set forth herein can improve performance of a computing environment in terms of resource utilization, response time, waiting time, throughput, turnaround time, fault tolerance, and/or energy consumption. According to one embodiment, a scheduler can determine whether a job residing in a job queue is decomposable into an independent job and a dependent job that depends on an independent job. A scheduler can assign a foreground VM for processing of an independent job and can assign a background VM for processing of a dependent job.

Figure 12:
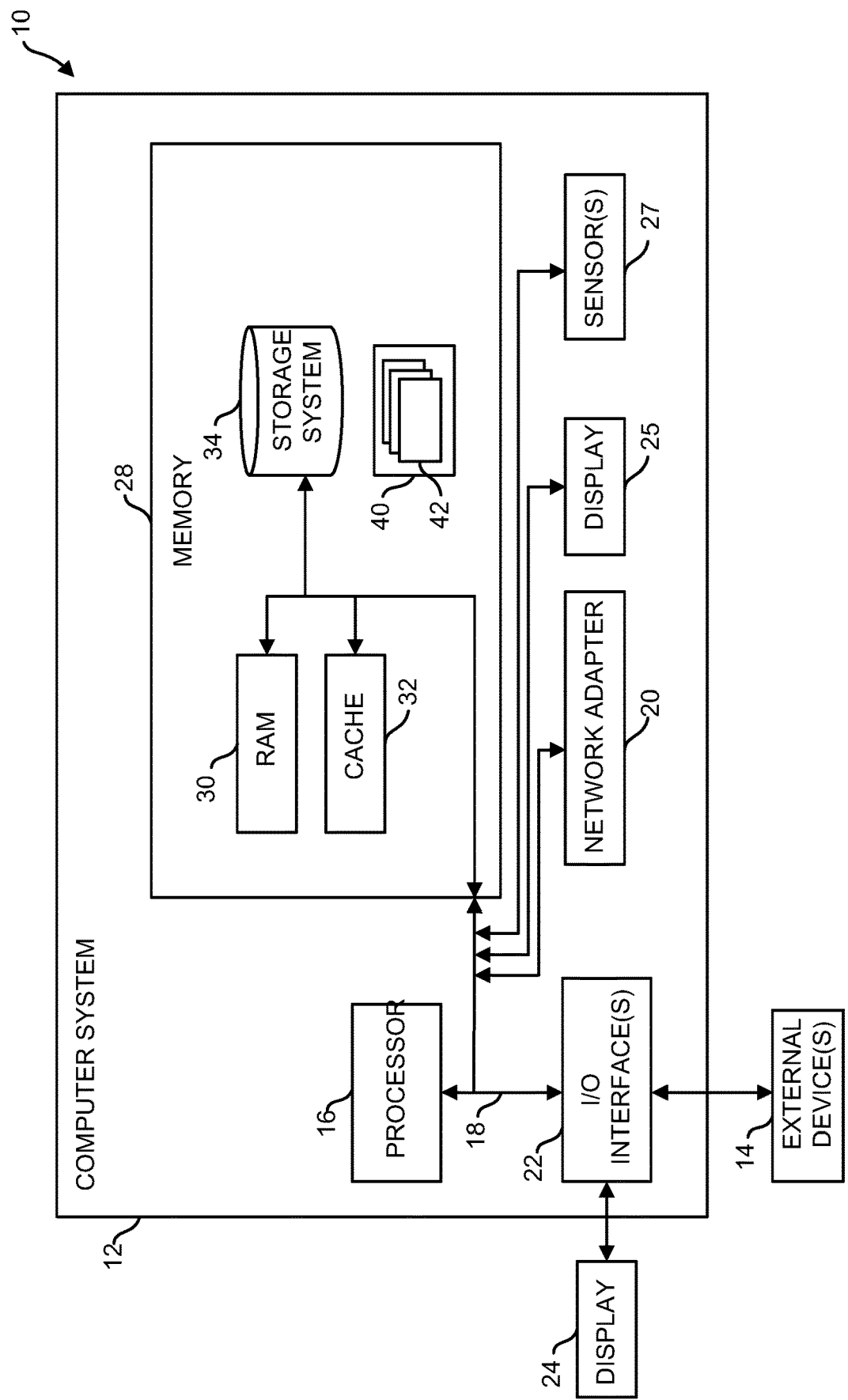
FIG. 12 depicts a computing node according to one embodiment.
Figure 13:
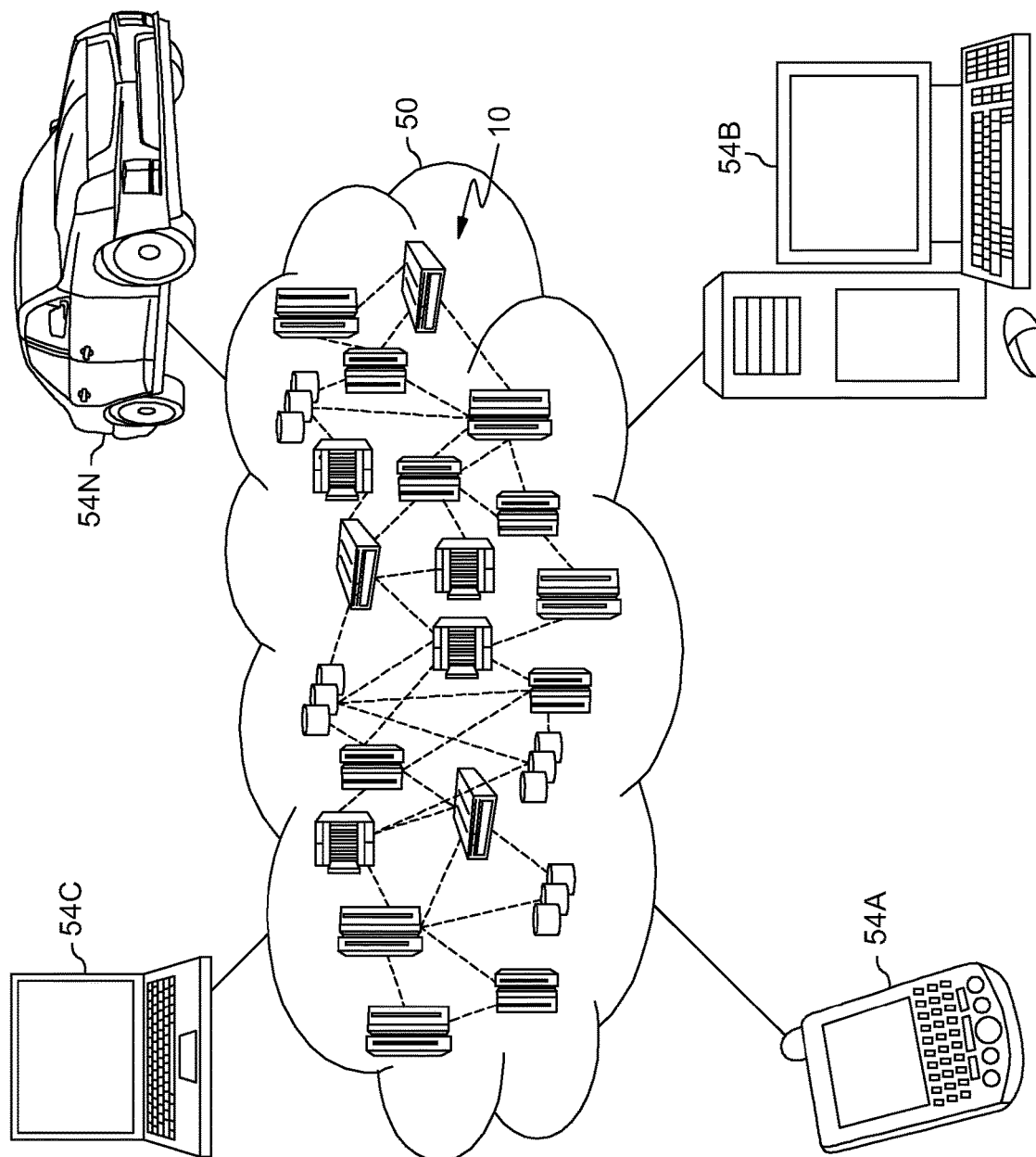
FIG. 13 depicts a cloud computing environment according to one embodiment.
Figure 14:
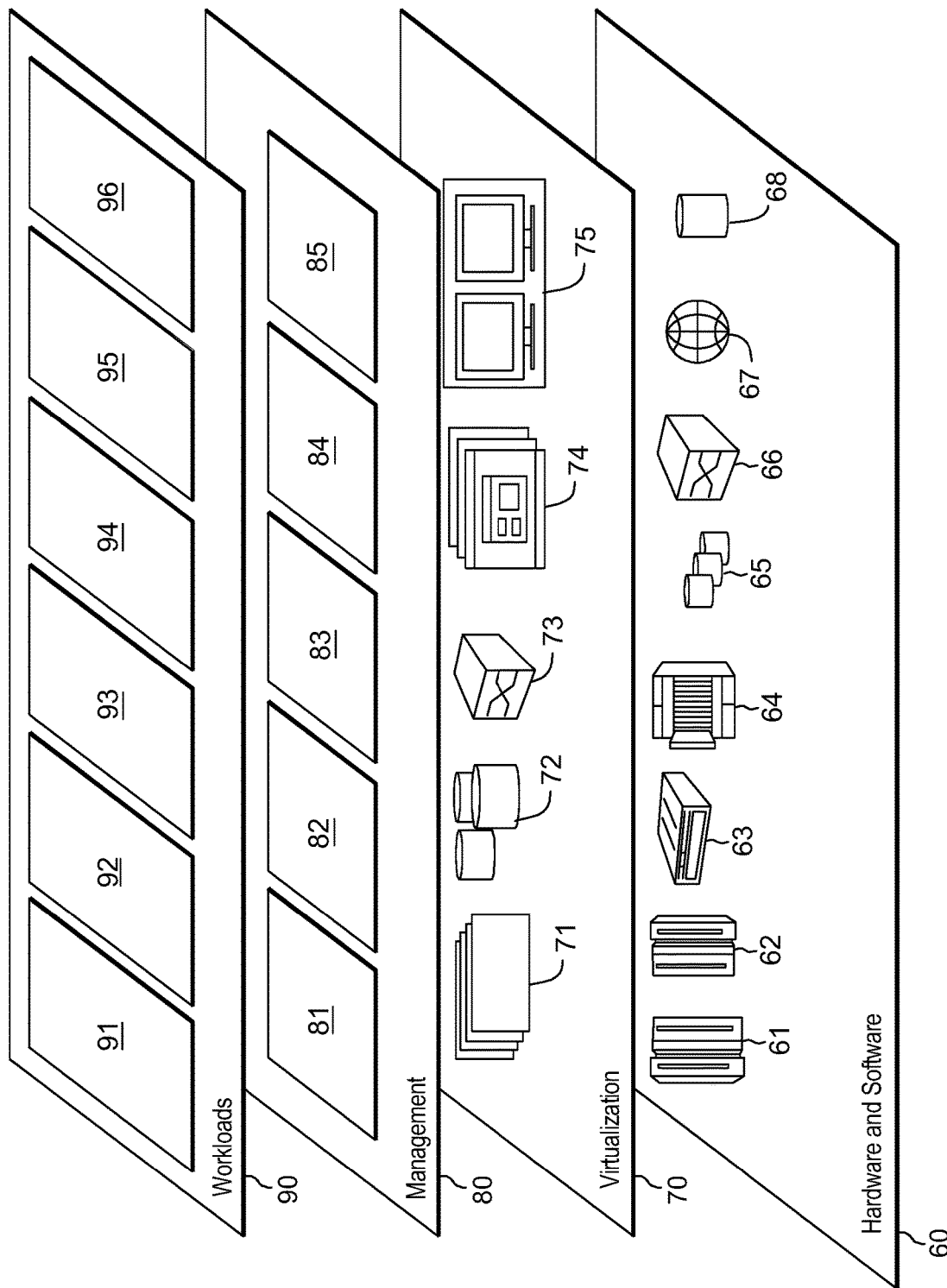
FIG. 14 depicts abstraction model layers according to one embodiment.

FIGS. 12-14 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 12, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 12, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 13 and 14.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, scheduler 150 can include one or more computing node 10 and can include one or more program 40 for performing functions described with reference to the flowcharts of FIGS. 2 and 3 as set forth herein. In one embodiment, supervisor 130 can include one or more computing node 10 and can include one or more program 40 for performing functions described with reference to supervisor 130 herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 13 computing node 10 is described as being implemented in a cloud computing environment and accordingly is referred to as a cloud computing node in the context of FIG. 13.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for scheduling as set forth herein. The processing components 96 can be implemented with use of one or more program 40 described in FIG. 12.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A computer implemented method comprising:
assigning resources of a K-tier resource pool to a certain job residing in a job queue, wherein the certain job residing in the job queue features job coupling characterized by an independent job and a dependent job which for completion depends on an output of the independent job, wherein the K-tier resource pool includes at least one foreground virtual machine (VM) having a first central processing unit (CPU) priority and at least one background virtual machine (VM) having a second CPU priority, wherein the first CPU priority is higher than the second CPU priority, wherein the assigning resources of the K-tier resource pool to the certain job includes assigning one or more foreground VM to the independent job and assigning one or more background VM to the dependent job; and
dispatching the certain job residing in the job queue to the K-tier resource pool for processing by the one or more foreground VM, and the one or more background VM in accordance with the assigning resources of the K-tier resource pool to the certain job.

2. The computer implemented method of claim 1, wherein the method includes determining that the certain job features job coupling characterized by the independent job and the dependent job which depends on the output from the independent job for completion, and wherein the assigning resources of the K-tier resource pool to the certain job is performed in response to the determining that the certain job features job coupling defined by the independent job and the dependent job which depends on the output from the independent job for completion.

3. The computer implemented method of claim 1, wherein the method includes determining that the certain job features job coupling characterized by the independent job and the dependent job which depends on the output from the independent job for completion, and wherein the assigning resources of the K-tier resource pool to the certain job is performed in response to the determining that the certain job features job coupling defined by the independent job and the dependent job which depends on the output from the independent job for completion, wherein the determining includes examining label data included within a job description associated to the certain job.

4. The computer implemented method of claim 1, wherein the method includes identifying one or more idle VM of the at least one foreground VMs of the resource pool and migrating one or more running job being processed by a background VM of the at least one background VM to the one or more idle VM.

5. The computer implemented method of claim 1, wherein the method includes examining job logging data of a completed job which has completed processing within the resources pool, updating label data of a subsequent job for dispatching to the resource pool subsequently to a time of the assigning resources of the K-tier resource pool to the certain job, and subsequently dispatching the subsequent job in dependence on the label data updated by the updating.

6. The computer implemented method of claim 1, wherein the method includes examining job logging data of a completed job which has completed processing within the resources pool, updating label data of a subsequent job for dispatching to the resource pool subsequently to a time of the assigning resources of the K-tier resource pool to the certain job, and subsequently dispatching the subsequent job in dependence on the label data updated by the updating, wherein the label data updated by the updating specifies that the subsequent job features job coupling characterized by a first job and a second job that depends on an output of the first job.

7. The computer implemented method of claim 1, wherein the independent job is defined by a first program and wherein the dependent job is defined by a second program.

8. The computer implemented method of claim 1, wherein the method includes, subsequent to the assigning resources of the K-tier resource pool to the certain job, further assigning resources of the K-tier resources to a specified job, wherein the specified job is an uncoupled job that is not decomposable into an independent job and a dependent job dependent on the independent job.

9. The computer implemented method of claim 1, wherein the method includes, subsequent to the assigning resources of the K-tier resource pool to the certain job, further assigning resources of the K-tier resources to a specified job, wherein the specified job is an uncoupled job that is not decomposable into an independent job and a dependent job dependent on the independent job, wherein the further assigning resources of the K-tier resources to the specifies job included restricting assigning of resources so that only one or more background VM of the at least one background VM, and not any foreground VM of the at least one foreground VM is assigned to the specified job.

10. The computer implemented method of claim 1, wherein the method includes, subsequent to the assigning resources of the K-tier resource pool to the certain job, further assigning resources of the K-tier resources to a specified job, wherein the method includes ascertaining that the specified job is an uncoupled job that is not decomposable into an independent job and a dependent job dependent on the independent job, wherein the further assigning resources of the K-tier resources to the specifies job included restricting assigning of resources so that only one or more background VM of the at least one background VM, and not any foreground VM of the at least one foreground VM is assigned to the specified job, wherein the further assigning resources is performed in response to the ascertaining.

11. The computer implemented method of claim 1, wherein the method includes determining that the certain job features job coupling defined by the independent job, the dependent job which depends on the output from the independent job for completion, and a second dependent job which depends on data from the independent job for completion, wherein the determining includes determining that the dependent job has a first lower degree of coupling to the independent job expressed by a first lower percentage value, and wherein the determining includes determining that the second dependent job has a second higher degree of coupling to the independent job expressed by second higher percentage value, wherein the K-tier resource pool includes at least one second background virtual machine (VM) having a third CPU priority, wherein the third CPU priority is lower than the second CPU priority, wherein the assigning resources of the K-tier resource pool to the certain job includes assigning one or more foreground VM to the independent job, assigning one or more background VM to the dependent job, and assigning one or more second background VM to the second dependent job.

12. The computer implemented method of claim 1, wherein the method includes determining that the certain job features job coupling defined by the independent job, the dependent job which depends on the output from the independent job for completion, and a second dependent job which depends on data from the independent job for completion, wherein the determining includes determining that the dependent job is a loosely coupled job with respect to the independent job expressed by a first lower percentage value, and wherein the determining includes determining that the second dependent job is a tightly coupled job with respect to the independent job expressed by second higher percentage value, wherein the K-tier resource pool includes at least one second background virtual machine (VM) having a third CPU priority, wherein the third CPU priority is lower than the second CPU priority, wherein the assigning resources of the K-tier resource pool to the certain job includes assigning one or more foreground VM to the independent job, assigning one or more background VM to the dependent job, and assigning one or more second background VM to the second dependent job.

13. A computer program product comprising:
  a computer readable storage medium readable by one or more processing circuit and storing instructions for execution by one or more processor for performing a method comprising:
    assigning resources of a K-tier resource pool to a certain job residing in a job queue, wherein the certain job residing in the job queue features job coupling characterized by an independent job and a dependent job which for completion depends on an output of the independent job, wherein the K-tier resource pool includes at least one foreground virtual machine (VM) having a first central processing unit (CPU) priority and at least one background virtual machine (VM) having a second CPU priority, wherein the first CPU priority is higher than the second CPU priority, wherein the assigning resources of the K-tier resource pool to the certain job includes assigning one or more foreground VM to the independent job and assigning one or more background VM to the dependent job; and
    dispatching the certain job residing in the job queue to the K-tier resource pool for processing by the one or more foreground VM, and the one or more background VM in accordance with the assigning resources of the K-tier resource pool to the certain job.

14. The computer program product of claim 13, wherein the method includes determining that the certain job is a coupled job defined by the independent job and the dependent job which depends on the output from the independent job for completion, and wherein the assigning resources of the K-tier resource pool to the certain job is performed in response to the determining that the certain job is a coupled job defined by the independent job and the dependent job which depends on the output from the independent job for completion.

15. The computer program product of claim 13, wherein the method includes determining that the certain job is a coupled job defined by the independent job and the dependent job which depends on the output from the independent job for completion, and wherein the assigning resources of the K-tier resource pool to the certain job is performed in response to the determining that the certain job is a coupled job defined by the independent job and the dependent job which depends on the output from the independent job for completion, wherein the determining includes examining label data included within a job description associated to the certain job.

16. The computer program product of claim 13, wherein the method includes examining job logging data of a completed job which has completed processing within the resources pool, updating label data of a subsequent job for dispatching to the resource pool subsequently to a time of the assigning resources of the K-tier resource pool to the certain job, and subsequently dispatching the subsequent job in dependence on the label data updated by the updating.

17. The computer program product of claim 13, wherein the method includes examining job logging data of a completed job which has completed processing within the resources pool, updating label data of a subsequent job for dispatching to the resource pool subsequently to a time of the assigning resources of the K-tier resource pool to the certain job, and subsequently dispatching the subsequent job in dependence on the label data updated by the updating, wherein the label data updated by the updating specifies that the subsequent job is a coupled job characterized by a first job and a second job that depends on an output of the first job.

18. A system comprising:
a memory;
at least one processor in communication with the memory; and
program instructions executable by one or more processor via the memory to perform a method comprising:
assigning resources of a K-tier resource pool to a certain job residing in a job queue, wherein the certain job residing in the job queue features job coupling characterized by an independent job and a dependent job which for completion depends on an output of the independent job, wherein the K-tier resource pool includes at least one foreground virtual machine (VM) having a first central processing unit (CPU) priority and at least one background virtual machine (VM) having a second CPU priority, wherein the first CPU priority is higher than the second CPU priority, wherein the assigning resources of the K-tier resource pool to the certain job includes assigning one or more foreground VM to the independent job and assigning one or more background VM to the dependent job; and
dispatching the certain job residing in the job queue to the K-tier resource pool for processing by the one or more foreground VM, and the one or more background VM in accordance with the assigning resources of the K-tier resource pool to the certain job.

19. The computer implemented method of claim 1, wherein the method includes determining that the dependent job has a first lower degree of coupling to the independent job expressed by a first lower percentage value, and determining that a second dependent job has a second higher degree of coupling to the independent job expressed by a second higher percentage value, wherein the K-tier resource pool includes at least one second background virtual machine (VM) having a third CPU priority, wherein the third CPU priority is lower than the second CPU priority, wherein the assigning resources of the K-tier resource pool to the certain job includes assigning one or more foreground VM to the independent job, assigning one or more background VM to the dependent job, and assigning one or more second background VM to the second dependent job.

20. The computer implemented method of claim 1, wherein the method includes determining that the dependent job is a loosely coupled job with respect to the independent job expressed by a first lower percentage value, and determining that a second dependent job is a tightly coupled job with respect to the independent job expressed by a second higher percentage value, wherein the K-tier resource pool includes at least one second background virtual machine (VM) having a third CPU priority, wherein the third CPU priority is lower than the second CPU priority, wherein the assigning resources of the K-tier resource pool to the certain job includes assigning one or more foreground VM to the independent job, assigning one or more background VM to the dependent job, and assigning one or more second background VM to the second dependent job.

* * * * *